US009606608B1

(12) United States Patent
Langhammer

(10) Patent No.: US 9,606,608 B1
(45) Date of Patent: Mar. 28, 2017

(54) LOW POWER OPTIMIZATIONS FOR A FLOATING POINT MULTIPLIER

(71) Applicant: Altera Corporation, San Jose, CA (US)

(72) Inventor: Martin Langhammer, Salisbury Wiltshire (GB)

(73) Assignee: ALTERA CORPORATION, San Jose, CA (US)

( * ) Notice: Subject to any disclaimer, the term of this patent is extended or adjusted under 35 U.S.C. 154(b) by 217 days.

(21) Appl. No.: 14/219,421

(22) Filed: Mar. 19, 2014

(51) Int. Cl.
*G06F 1/32* (2006.01)
*G06F 7/53* (2006.01)
*H02J 3/32* (2006.01)

(52) U.S. Cl.
CPC .......... *G06F 1/3234* (2013.01); *G06F 7/5324* (2013.01); *G06F 2207/382* (2013.01); *G06F 2207/3828* (2013.01); *H02J 3/32* (2013.01)

(58) Field of Classification Search
CPC ............. G06F 1/3234; G06F 2207/382; G06F 2207/3828; H02J 7/5324
See application file for complete search history.

(56) References Cited

U.S. PATENT DOCUMENTS

| | | | | | |
|---|---|---|---|---|---|
| 5,586,070 | A | * | 12/1996 | Purcell | G06F 7/5324 708/620 |
| 5,751,622 | A | * | 5/1998 | Purcell | G06F 7/5324 708/625 |
| 6,611,857 | B1 | * | 8/2003 | Lemonds | G06F 1/3243 708/629 |
| 8,918,446 | B2 | * | 12/2014 | Boswell | G06F 1/3203 708/503 |
| 2011/0060780 | A1 | * | 3/2011 | Berkley | B82Y 10/00 708/207 |
| 2011/0219052 | A1 | * | 9/2011 | Langhammer | G06F 17/141 708/205 |
| 2012/0151191 | A1 | * | 6/2012 | Boswell | G06F 1/3203 712/222 |

OTHER PUBLICATIONS

"Combined IEEE Compliant and Truncated Floating Point Multipliers for Reduced Power Dissipation," Wires, Kent E., et al : 2001 International Conference on Computer Design, 2001. ICCD 2001, pp. 497-500, Sep. 23-26, 2001.

* cited by examiner

*Primary Examiner* — Abdelmoniem Elamin

(57) ABSTRACT

Systems and methods are described herein for reducing an amount of power consumption in a programmable integrated circuit device configured to perform a multiplication operation. The device includes a first multiplier that generates a first partial product associated with a first set of bit locations and a second multiplier that generates a second partial product associated with a second set of bit locations that are more significant than the first set of bit locations. The device further includes a switching circuitry to deactivate the first multiplier to reduce an amount of power consumed by the programmable integrated circuit device.

16 Claims, 8 Drawing Sheets

LOW POWER OPTIMIZATIONS FOR A FLOATING POINT MULTIPLIER

FIELD

The present disclosure relates to configurable specialized processing blocks in a programmable integrated circuit device for performing arithmetic operations. In particular, the present disclosure relates to reducing power consumption in a floating point multiplier.

BACKGROUND

Considering a programmable logic device (PLD) as one example of an integrated circuit device, as applications for which PLDs are used increase in complexity, it has become more common to design PLDs to include configurable specialized processing blocks in addition to blocks of generic programmable logic resources. Such configurable specialized processing blocks may include a concentration of circuitry on a PLD that has been partly or fully hardwired to perform one or more specific tasks, such as a logical or a mathematical operation. A configurable specialized processing block may also contain one or more specialized structures, such as an array of configurable memory elements. Examples of structures that are commonly implemented in such configurable specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

These fixed-logic elements within the configurable specialized processing blocks are interconnected by a configurable interconnect structure within the configurable specialized processing block. They may also be able to accept parameters as well as data inputs. Thus, while the elements are fixed in the type of arithmetic or logical functions that they perform, their interconnection within the block is flexible under user control, and moreover, if an element accepts parameters, then the way in which it performs its fixed function may be subject to a degree of user control. In addition, it may be possible to route the outputs of some or all of the fixed-logic elements within a block either to another fixed-logic element within the block or directly out of the block.

One particularly useful type of configurable specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, PLDs sold by Altera Corporation, of San Jose, Calif., as part of the STRATIX® and ARRIA® families include DSP blocks, each of which includes a plurality of multipliers. Each of those DSP blocks also includes adders and registers, as well as programmable connectors (e.g., multiplexers) that allow the various components of the block to be configured in different ways.

Some existing configurable specialized processing blocks may consume more power than is necessary. Existing configurable specialized processing blocks may benefit from architectural modifications, such as changes to components that consume a large proportion of the power.

SUMMARY

For applications where some imprecision is tolerable, it is advantageous to modify a configurable specialized processing block to reduce the amount of power consumed by the processing block. As used herein, a "processing block" refers to a configurable specialized processing block, unless explicitly stated otherwise. Sometimes, the advantage of reducing the power consumption outweighs the disadvantages of having an imprecise mathematical result. The present disclosure provides processing blocks that have a reduced power consumption and a reduced precision.

In one embodiment, a configurable specialized processing block is included on a programmable integrated circuit device. The processing block includes a first multiplier that generates a first partial product associated with a first set of bit locations and a second multiplier that generates a second partial product associated with a second set of bit locations that are more significant than the first set of bit locations. The processing block also includes a switching circuitry to deactivate the first multiplier to reduce an amount of power consumed by the configurable specialized processing block. The programmable integrated circuit device may be a programmable logic device.

The processing block may also include a compressor tree that combines the first partial product and the second partial product to generate a multiplication result that is less precise when the first multiplier is deactivated compared to when the first multiplier is not deactivated. At least one output of the compressor tree may be provided to a logic gate that is configured to selectively zero the at least one output. The logic gate may be an AND gate, and an input to the AND gate may be a zero signal.

The compressor tree of the processing block may also be configured to generate at least one output that is provided to a carry propagation adder. The at least one output may be zeroed before being provided to the carry propagation adder. The at least one output may correspond to a set of least significant bits of the first partial product.

In some embodiments, a portion of the first partial product may be combined with the second partial product to obtain a multiplication result. The result may be more precise than when the first multiplier is deactivated by some amount, such as by one bit. The processing block may also include a multiplexer that directly receives the portion of the first partial product. By routing the portion of the first partial product directly to the multiplexer, the portion of the first partial product may not be passed through a compressor tree. The portion of the first partial product may include the most significant bit of the first partial product.

The processing block may further include truncating circuitry configured to set a first number of the least significant bits of the first partial product to zero and to set a second number of the least significant bits of the second partial product to zero, wherein the first number is greater than the second number. The truncating circuitry may be further configured to select from at least two truncation levels, each truncation level associated with a different precision of a multiplication operation.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION

Figure 1:
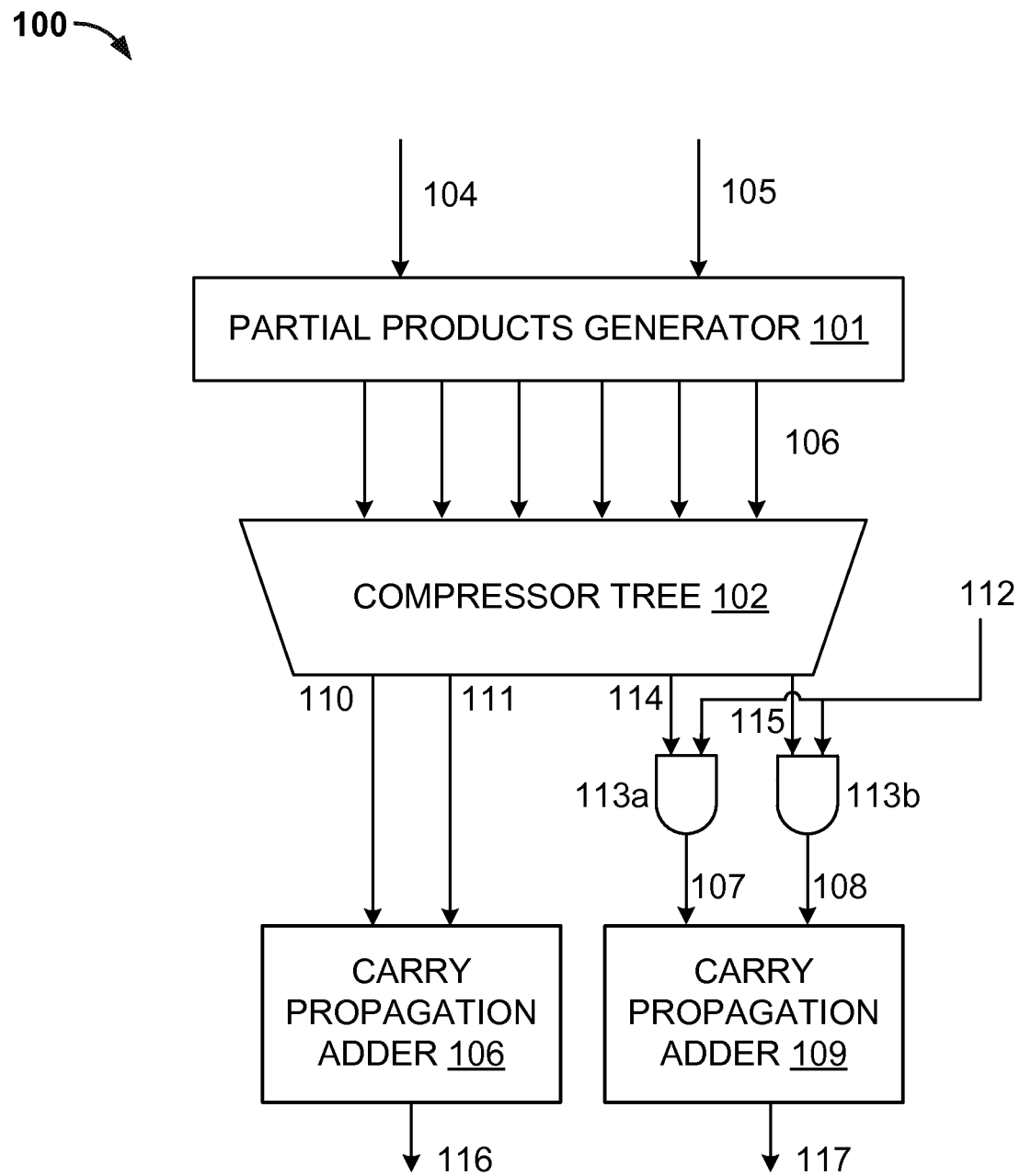
FIG. 1 shows an illustrative processing block including a reduced power multiplier, in accordance with some embodiments of the present disclosure.

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

The figures described herein show illustrative embodiments, however the figures may not necessarily not show and may not be intended to show the exact layout of the hardware components contained in the embodiments. The figures are provided merely to illustrate the high level conceptual layouts of the embodiments. The embodiments disclosed herein may be implemented with any suitable number of components and any suitable layout of components in accordance with principles known in the art.

Although some of the figures may indicate specific number of bits used in some of the illustrative embodiments, those numbers of bits may be provided by way of example only. The embodiments disclosed herein may be implemented to accommodate any suitable number of bits.

Floating point numbers are commonplace for representing real numbers in scientific notation in computing systems. Examples of real numbers in scientific notation are:

$3.14159265_{10} \times 10^0 (\pi)$ $2.718281828_{10} \times 10^0 (e)$ $0.000000001_{10}$ or $1.0_{10} \times 10^{-9}$ (seconds in a nanosecond)

$3155760000_{10}$ or $3.15576_{10} \times 10^9$ (seconds in a century)

The first two examples are real numbers in the range of the lower integers, the third example represents a very small fraction, and the fourth example represents a very large integer. Floating point numbers in computing systems are designed to cover the large numeric range and diverse precision requirements shown in these examples. Fixed point number systems have a very limited window of representation which prevents them from representing very large or very small numbers simultaneously. The position of the notional binary-point in fixed point numbers addresses this numeric range problem to a certain extent but does so at the expense of precision. With a floating point number, the window of representation can move. This allows for an appropriate amount of precision for the scale of the number.

Floating point representation is generally preferred over fixed point representation in computing systems because floating point representation permits an ideal balance of numeric range and precision. However, floating point representation requires more complex implementation compared to fixed point representation.

The IEEE754-1985 standard is commonly used for floating point numbers. A floating point number includes three different parts: the sign of the number, its mantissa and its exponent. Each of these parts may be represented by a binary number and, in the IEEE754-1985 format, have the following bit sizes:

| | Sign | Exponent | Bias | Mantissa |
|---|---|---|---|---|
| Single Precision 32-Bit | 1 bit [31] | 8 bits [30 . . . 23] | −127 | 23 bits [22 . . . 00] |
| Double Precision 64-Bit | 1 bit [63] | 11 bits [62 . . . 52] | −1023 | 52 bits [51 . . . 0] |

The exponent may be an unsigned binary number which, for the single precision format, ranges from 0 to 255. In order to represent a very small number, negative exponents may be used. To achieve this, the exponent may be associated with a negative bias. For example, the bias may be −127 for single-precision numbers. In this case, a value of 140 for the exponent actually represents (140-127)=13, and a value of 100 represents (100-127)=−27. For double precision numbers, the exponent bias may be −1023.

According to the IEEE754-1985 standard, the mantissa is a normalized number—i.e., it has no leading zeroes and represents the precision component of a floating point number. Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision. Therefore, in single precision format, the mantissa typically includes 24 bits of precision.

A DSP block may support both fixed and floating point multipliers, which share much of the same logic. The IEEE 754-1985 standard requires that the result of each floating point operation (such as a multiplication) be identical to the result obtained by first computing the result to infinite precision and then rounding. Ensuring that an operation is compliant with the IEEE standard is computationally expensive and consumes a large amount of power. There is generally a trade-off between the power consumption and the precision of an operation, and there are many applications that do not require as much precision as is required by the standard. These applications tolerate up to a certain amount of imprecision, and that tolerable amount of imprecision may be used to design floating point multipliers with reduced power. Thus, it is generally desirable to design floating point multipliers with reduced power consumption and less precision than IEEE compliant multipliers.

FIG. 1 shows an illustrative processing block 100 that includes a reduced power multiplier, in accordance with some embodiments of the present disclosure. Processing block 100 may be part of a programmable integrated circuit device, such as an application specific integrated circuit (ASIC), an application specific standard product (ASSP), a programmable logic device (PLD), a field programmable gate array (FPGA), or any other suitable programmable integrated circuit device. In one example, processing block 100 may be a configurable specialized processing block such as that described in U.S. patent application Ser. No. 14/180,664, filed Feb. 14, 2014, now U.S. Pat. No. 9,507,565. Processing block 100 may include a partial products generator 101, a compressor tree 102, two logic gates 113a and 113b (generally, logic gate 113), and two carry propagation adders 106 and 109. Processing block 100 may provide the ability to perform floating point multiplication at reduced power by zeroing out some of the outputs of compressor tree 102.

Processing block 100 performs various arithmetic operations on inputs 104 and 105 to produce outputs 116 and 118, and may operate in combination with other processing blocks to perform various mathematical functions. For floating point multiplication, inputs 104 and 105 may be two mantissas, and outputs 116 and 118 may be the more significant bits and less significant bits, respectively, of the product between inputs 104 and 105. Inputs 104 and 105 may be input into partial products generator 101, which provides partial products 106 to compressor tree 102. Compressor tree 102 may convert the partial products 106 into two sum vectors 110 and 114 and two carry vectors 111 and 115. As shown in FIG. 1, more significant bits may be represented by sum vector 110 and carry vector 111, and less significant bits may be represented by sum vector 114 and carry vector 115. In an example, sum vector 110 and carry vector 111 may be equal in size to the precision of one or more of inputs 104 and 105, or may be more precise than the inputs 104 and 105.

Sum vector 110 and carry vector 111 are provided to carry propagation adder 106, which generates output 116, or the more significant bits of the product between inputs 104 and 105. In contrast, rather than being transmitted directly from compressor tree 102 to carry propagation adder 109, sum vector 114 and carry vector 115 may be transmitted to two logic gates 113a and 113b (generally, logic gate 113), respectively. In one example, logic gates 113a and 113b are AND gates. As shown in FIG. 1, logic gate 113a receives as input the sum vector 114 of the less significant bits from compressor tree 102 and an input control signal 112. Similarly, logic gate 113b receives as input the carry vector 115 of the less significant bits from compressor tree 102 and input control signal 112. Logic gates 113a and 113b may perform a logic operation on their inputs and provide outputs representative of a result of the logic operation. The output 107 of logic gate 113a and the output 108 of logic gate 113b may be transmitted to carry propagation adder 109, which generates output 117, or the less significant bits of the product between input mantissas 104 and 105.

The use of logic gates 113a and 113b in processing block 100 reduces the amount of power consumed by the device because the processing of carry propagate adder 117 is greatly simplified. Input control signal 112 may be binary valued, and may be configured to switch between 0 and 1. When input control signal 112 is one, the output 107 of logic gate 113a is the same as sum vector 114, and the output 108 of logic gate 113b is the same as carry vector 115. Alternatively, when input control signal 112 is zero, the outputs 107 and 108 of logic gates 113a and 113b, respectively, are both zero. Thus, the least significant bit outputs 114 and 115 of compressor tree 102 may be zeroed out by designing logic gates 113a and 113b as AND gates and setting input control signal 112 to a zero value. This effectively truncates the multiplication operation and removes the operational power that is consumed by carry propagation adder 109 during non-truncated operation when input control signal 112 has a value of one, thereby reducing the amount of power consumed by processing block 100 and resulting in less precision at the output of the multiplication.

In some embodiments of the present disclosure, a larger multiplier may be represented as a combination of a number of smaller multipliers. In particular, the larger multiplier receives long inputs (length m, for example), and includes several smaller multipliers, which receive shorter inputs (length n<m, for example). The smaller multipliers provide intermediate products, which may be arranged or shifted such that the combination of the intermediate products may form the final desired product of the larger multiplier. In this case, the larger multiplier is said to be decomposed into a number of smaller multipliers.

One way of reducing the amount of power consumed by a processing block is to isolate one or more of the smaller multipliers within the larger multiplier. To isolate a selected one or more of the smaller multipliers, the other smaller multipliers within the larger multiplier are selectively deactivated such that only the selected one or more smaller multipliers are active. By isolating a subset of the smaller multipliers within the larger multiplier, power consumption is reduced because the other smaller multipliers are deactivated and thus consume minimal power, if any. When any of the smaller multipliers are deactivated, the intermediate products of the remaining smaller multipliers should be appropriately shifted to account for the deactivation. In general, it is desirable to isolate the one or more smaller multipliers that perform computation on the more significant input bits, and to deactivate the smaller multipliers that operate on the less significant input bits. Two examples of decompositions of a larger multiplier are shown in relation to FIGS. 2 and 3. In particular, the smaller multiplier that operates on the more significant bits of the inputs to the larger multiplier may be isolated to reduce power consumption and precision.

Figure 2:
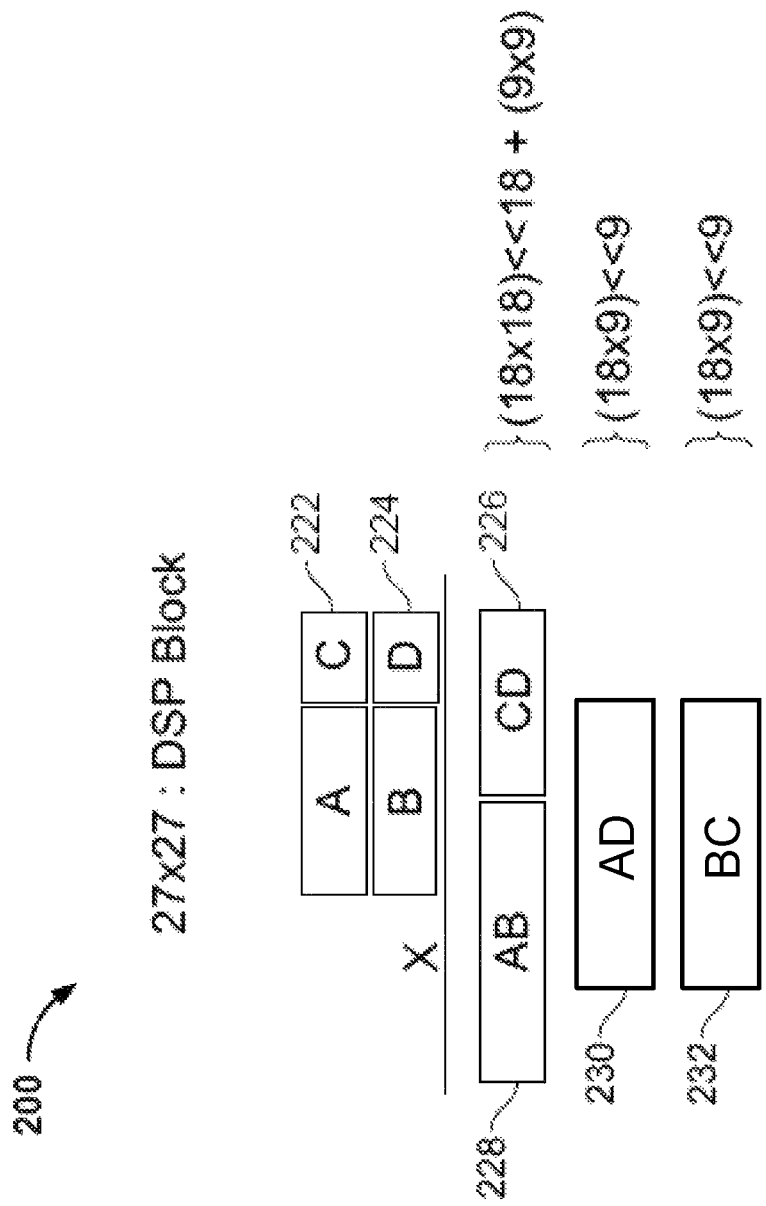
FIGS. 2 and 3 show illustrative diagrams of a larger multiplier decomposed into several smaller multipliers, in accordance with some embodiments of the present disclosure.
Figure 3:
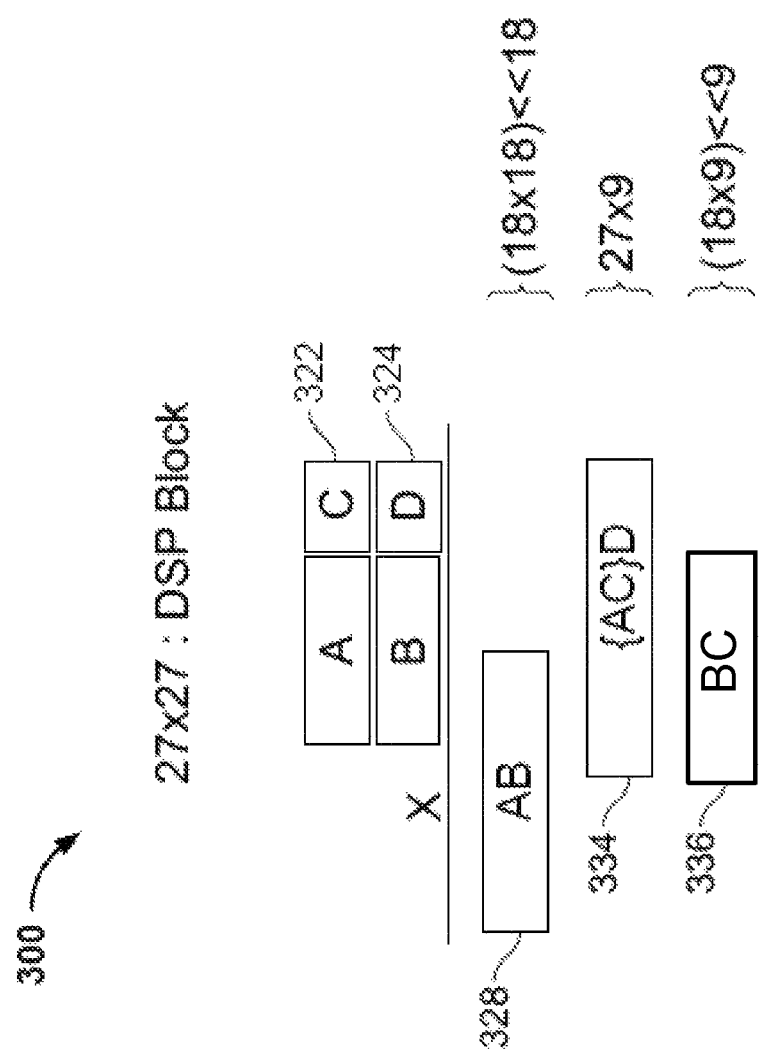

FIGS. 2 and 3 show illustrative diagrams of a larger multiplier decomposed into several smaller multipliers, in accordance with some embodiments of the present disclosure. Each multiplier shown in FIGS. 2 and 3 may be implemented using a processing block similar in form and/or function to processing block 100 of FIG. 1, and the same processing block may be used to implement any combination of the multipliers shown in FIGS. 2 and 3. Diagrams 200 and 300 show two different ways that a 27×27 fixed point multiplier may be decomposed, and are shown herein for illustrative purposes only. Even though only two examples are shown, one of ordinary skill in the art will understand that in general, many other decompositions are possible and may be used in accordance with the present disclosure.

Diagram 200 shows a multiplication of a 27 bit number P by a 27 bit number Q. The multiplication may be performed by one or more processing blocks, each of which may be processing block 100 of FIG. 1. As shown in FIG. 2, at 222, P may be represented as an 18 bit number A and a 9 bit number C, where $P=A*(2^9)+C$. A may represent the most significant 18 bits of P, and C may represent the least significant 9 bits of P. Similarly, at 224, Q may be represented as an 18 bit number B and a 9 bit number D, where $Q=B*(2^9)+D$. B may represent the most significant 18 bits of Q, and C may represent the least significant 9 bits of Q.

As shown in FIG. 2, four intermediate products (e.g., A*B, C*D, A*D, and B*C) may be computed and combined to obtain the final product P*Q. At 226, a processing block may be used to obtain the intermediate product CD using one of processing block's multipliers to perform a 9×9 number multiplication. Similarly, at 228 a processing block may be used to obtain the intermediate product AB using an 18×18 multiplier. Moreover, at 230 and 232, a processing block may be used to obtain the intermediate products AD and BC using an 18×9 multiplier. The same or different processing blocks may be used at 230 and 232. Any of the multiplications performed at 226, 228, 230, and 232 may be performed by multipliers similar in form and function to processing block 100 shown in relation to FIG. 1.

The one or more processing blocks used at 228, 230, and 232 may further include bit-shifters to shift the intermediate products by a number of bits to the left. The amount of shifting is dependent on the significance of the multiplicand and multiplier in the intermediate product in relation to the multiplicand and multiplier in the product PQ. In particular, the bit-shifter used at 228 may shift the intermediate product AB to the left by 18 bits, because A represents a portion of P that is more significant than the first 9 bits, and B represents a portion of Q that is more significant than the first 9 bits. Thus, A contributes to 9 bits of left shifting, and B contributes to another 9 bits of left shifting. The operation performed at 228 may thus be denoted (18×18)<<18.

Moreover, the bit-shifter used at 230 may shift the intermediate product AD to the left by 9 bits (9 bits from A and 0 bits from D), and the operation performed at 230 may be denoted (18×9)<<9. The bit-shifter used at 232 may shift the intermediate product BC to the left by 9 bits (9 bits from B and 0 bits from C), and the operation performed at 232 may be denoted (18×9)<<9. The intermediate product CD computed at 226 may not be bit shifted by any amount because C and D are both the least significant bits of P and Q, respectively. The operation performed at 226 may be denoted (9×9). The resulting shifted intermediate products may be added together to compute the final product of the 27×27 bit multiplication of P and Q. In an example, compressor tree 102 may perform addition of the intermediate products to generate sum and carry vectors, which may then be passed to carry propagation adders such as 106 and 109 to generate the final product.

Diagram 300 shows another decomposition of a 27×27 multiplication into several smaller multipliers. As in diagram 200, diagram 300 shows the multiplication of a 27 bit number P by a 27 bit number Q. The multiplication may be performed by one or more processing blocks, each of which may be processing block 100 of FIG. 1. As in diagram 200, at 322, P may be represented as an 18 bit number A and a 9 bit number C, where P=A*(2^9)+C. A may represent the most significant 18 bits of P, and C may represent the least significant 9 bits of P. Similarly, at 324, Q may be represented as an 18 bit number B and a 9 bit number D, where Q=B*(2^9)+D. B may represent the most significant 18 bits of Q, and C may represent the least significant 9 bits of Q.

As shown in FIG. 3, three intermediate products (e.g., A*B, {AC}*D, and BC) may be computed and combined to obtain the final product P*Q. At 328, a processing block may be used to obtain the intermediate product AB using one of processing block's multipliers to perform a 18×18 number multiplication. Similarly, at 334 a processing block may be used to obtain the intermediate product {AC}D using a 27×9 multiplier. Moreover, at 336, a processing block may be used to obtain the intermediate product BC using an 18×9 multiplier. Any of the multiplications performed at 328, 334, or 336 may be performed by multipliers similar in form and function to processing block 100 shown in relation to FIG. 1.

The one or more processing blocks used at 328 and 336 may further include bit-shifters to shift the intermediate products by a number of bits to the left. As described in relation to FIG. 2, the bit-shifter used at 328 may shift the intermediate product AB to the left by 18 bits, because A contributes to 9 bits of left shifting, and B contributes to another 9 bits of left shifting. The operation performed at 328 may thus be denoted (18×18)<<18.

Moreover, the bit-shifter used at 336 may shift the intermediate product BC to the left by 9 bits (9 bits from B and 0 bits from C), and the operation performed at 336 may be denoted (18×9)<<9. The intermediate product {AC}D computed at 334 may not be bit-shifted by any amount because {AC} is the full representation of P, and D represents the least significant bits of Q. The operation performed at 334 is denoted (27×9). The resulting shifted intermediate products may be added together to compute the final product of the 27×27 bit multiplication of P and Q.

FIGS. 2 and 3 are illustrative examples of how a larger multiplier may be implemented by a number of smaller multipliers. In particular, diagrams 200 and 300 are described in relation to performing 27 bit by 27 number bit multiplication using smaller multiplication blocks. In general, multiple smaller multiplication blocks may be combined appropriately to perform multiplications on inputs containing any other numbers of bits.

One way to reduce power in a multiplier is to zero out (or truncate) a number of the least significant bits of the inputs into the multiplier. However, performing this type of truncation at the input stage has barely any effect on reducing the amount of power consumed by the device. In an example, the least significant 6 bits of both inputs into a 27×27 multiplier as shown in FIG. 3 are truncated (such that only the most significant 21 bits remain in each input). In this case, 60% of the partial products in the 27×9 multiplier at 334 and in the 18×9 multiplier at 336 are zeroed, thereby reducing some power. However, a large portion of the compressor tree is still operating. Because the compressor tree may consume more power than the partial product generator and a large proportion of the overall power in the processing block, the amount of power reduction when simply truncating at the inputs of a multiplier is not significant.

Another way to reduce power in a 27×27 multiplier is to isolate one of the smaller multipliers shown in FIGS. 2 and 3 by selecting a smaller multiplier to activate and deactivating all other non-selected smaller multipliers. In an example, since the operation at 228 and 328 is performed on the two sets of most significant bits of the inputs P and Q, the multipliers used at 228 and 328 may be isolated, and the other multipliers at 226, 230, and 232 in diagram 200 and at 334 and 336 in diagram 300 may be deactivated. In some embodiments, the other multipliers (226, 230, 232, 334, and 336) may still be used for other types of reduced precision multipliers.

In general, for multipliers with reduced precision, care should be taken to properly align the rounding point so that the output number corresponds to the desired result. In an example, a 27×27 fixed point multiplier may be used to implement a 23 bit single precision multiplication operation (plus the implied 1 bit). This is shown below in Eq. 1.

$$\begin{array}{r}0001AAAAAAAAAAAAAAAAAAAAAAA\times \\ 0001BBBBBBBBBBBBBBBBBBBBBBB \\ \hline 0000001XXXXXXXXXXXXXXXXXXXXXXX\cdot \\ YYYYYYYYYYYYYYYYYYYYYYY\end{array}$$ Equation 1

As shown in Eq. 1, a 23 bit number represented by 23 bits of "A" with a leading 1 may be represented by the 27 bit number "0001AAAAAAAAAAAAAAAAAAAAAAA". Similarly, the 23 bits of "B" with a leading 1 may be represented by the 27 bit number "x0001BBBBBBBBBBBBBBBBBBBBBBB". The result of the multiplication between the two 27 bit numbers is a 53 or 54 bit number, including six 0s at the six most significant locations, followed by a 1 value, and 46 or 47 additional bits. For example, when the mantissa multiplication is less than two (i.e., result is between 1.000000 and 1.999999), 46 additional bits are used, and when the mantissa multiplication is at least two (i.e., result is between 2.000000 and 3.999999), 47 additional bits are used. Of the 46 of 47 additional bits, there are 23 bits of X at the 23 more significant locations, and 23 (or 24) bits of Y at the 23 (or 24) least significant locations. The 23 (or 24) bits of Y are positioned to the right of the rounding point and may be used to determine how to round the least significant bit of X.

In accordance with some embodiments of the present disclosure, a smaller multiplier within a larger multiplier may be isolated. In particular, the 18×18 multiplier shown in FIGS. 2 and 3 may be isolated. The isolated multiplier performs operations on the most significant bits of P and Q, but in general, may be any of the smaller multipliers within a larger multiplier. To implement the 18×18 multiplication operation, the most significant 17 bits of A and B are used with a leading one. The remaining 9 bits of each input into the 27×27 multiplier are zeroed. This is shown below in Eq. 2.

$$\begin{array}{r}1AAAAAAAAAAAAAAAAA000000000\times \\ 1BBBBBBBBBBBBBBBBB000000000 \\ \hline 1XXXXXXXXXXXXXXXXX\cdot \\ YYYYYYYYYYYYYYYYYB000000000000000000\end{array}$$ Equation 2

As shown in Eq. 2, one 27 bit number may be represented by a most significant bit of 1, followed by 17 bits of "A" and 9 zero bits, and another 27 bit number may be represented by a most significant bit of 1, followed by 17 bits of "B" and 9 zero bits. The result of the multiplication between the two 27 bit numbers is a 54 bit number, including a one at the most significant location, 17 bits of X, and 35 (or 36) bits of Y at the 35 (or 36) least significant locations. The 35 (or 36) bits of Y are positioned to the right of the rounding point and may be used to determine how to round the least significant bit of X. The rounding may be implemented with a single level of logic, which may be as simple as a carry propagate adder, or in programmable logic outside the processing block.

The 18×18 multiplier shown in FIGS. 2 and 3 may be used in isolation. In an example, an 18×18 multiplier is a part of a 27×27 multiplier, and the lower 24 bits are used for the mantissa multiplication. In this case, for a 23 bit mantissa (in a 24×24 bit multiplier), the upper four bits of the 18 bit multiplier are zeroed, such that the implied one is set at bit position 14. In another example, for a 17 bit mantissa (in a 18×18 bit multiplier), all of the 18×18 multiplier is used, such that the implied one is set at bit position 18. Then the resulting least significant X bit is at location 36 (as in Eq. 2) rather than at location 24 (as in Eq. 1), where the rounding decision boundary for the 23 bit mantissa multiplier is expected to be located. As described herein, there are several ways to move the least significant X bit to the position that is immediately to the left of the existing rounding boundary (here, between locations 23 and 24).

In a first example, the rounding capability may be ignored, and the unrounded output from locations [54:37] are used. In this case, the output of the CPA from [54:37] is moved to [48:31] such that the most significant bit of the 18×18 multiplier is shifted to the same bit location as the 24×24 output from the 27×27 multiplier. This value is unnormalized, so the normalization may be combined with a single precision normalization process. Alternatively, the normalization may be independent from the single precision normalization, and the result may be multiplexed with the single precision mantissa to create the output of the multiplier.

In a second example, the sum and carry vectors of the 18×18 multiplier output may be directly routed to [42:7]. In this case, the single precision rounding circuitry may appropriately perform the rounding of these values. The normalization may be combined with the routing of the sum and carry vectors. In particular, a normalization selection bit determines whether the mantissa multiplication is less than two or not, and the checking of the normalization selection bit is moved from bit 48 to bit 42. For example, when the mantissa multiplication is less than two (i.e., result is between 1.000000 and 1.999999), the $48^{th}$ bit for the 24×24 multiplier is zero, or the $36^{th}$ bit for the 18×18 multiplier is zero. In this case, no normalization is necessary. Otherwise, when the mantissa multiplication is at least two (i.e., result is between 2.000000 and 3.999999), the $48^{th}$ bit for the 24×24 multiplier is one, or the $36^{th}$ bit for the 18×18 multiplier is one. In this case, normalization occurs by shifting the result to the right by one bit.

In a third example, the 18×18 multiplication may have a dedicated normalization circuit, and the result of the normalization may be multiplexed into the floating point output of the multiplier at the appropriate position.

As described above, isolating the 18×18 multiplier supports up to a 17 bit mantissa, because the implied leading 1 in the input needs to be multiplied as well. However, it may be desirable to support a larger mantissa size, such as 18 bits. Any combination of the other multiplier structures 226, 230, and 232 in FIG. 2 or 334 and 336 in FIG. 3 may be used to extend the 18×18 multiplier by 1 or more bits efficiently. In particular, one or more of these other smaller multipliers that were described above as being deactivated may be used to implement the desired larger mantissa size. While it may be desirable to implement a larger mantissa size, the power consumption will increase, because at least part of the compressor tree will be used. The highest indexed partial product may be used. In the configuration set up described below in relation to FIG. 4, a 0 or a 1× version of the multiplicand may be generated. To generate either version, the multiplier is not routed to the most significant bit, but rather to the position of the most significant bit minus two (or two bits to the right of the most significant bit), when a modified booth's radix 4 multiplier architecture is used. When other multiplier architectures are used, such as modified booth's radix 8, other multiplier bit mappings may be implemented.

Figure 4:
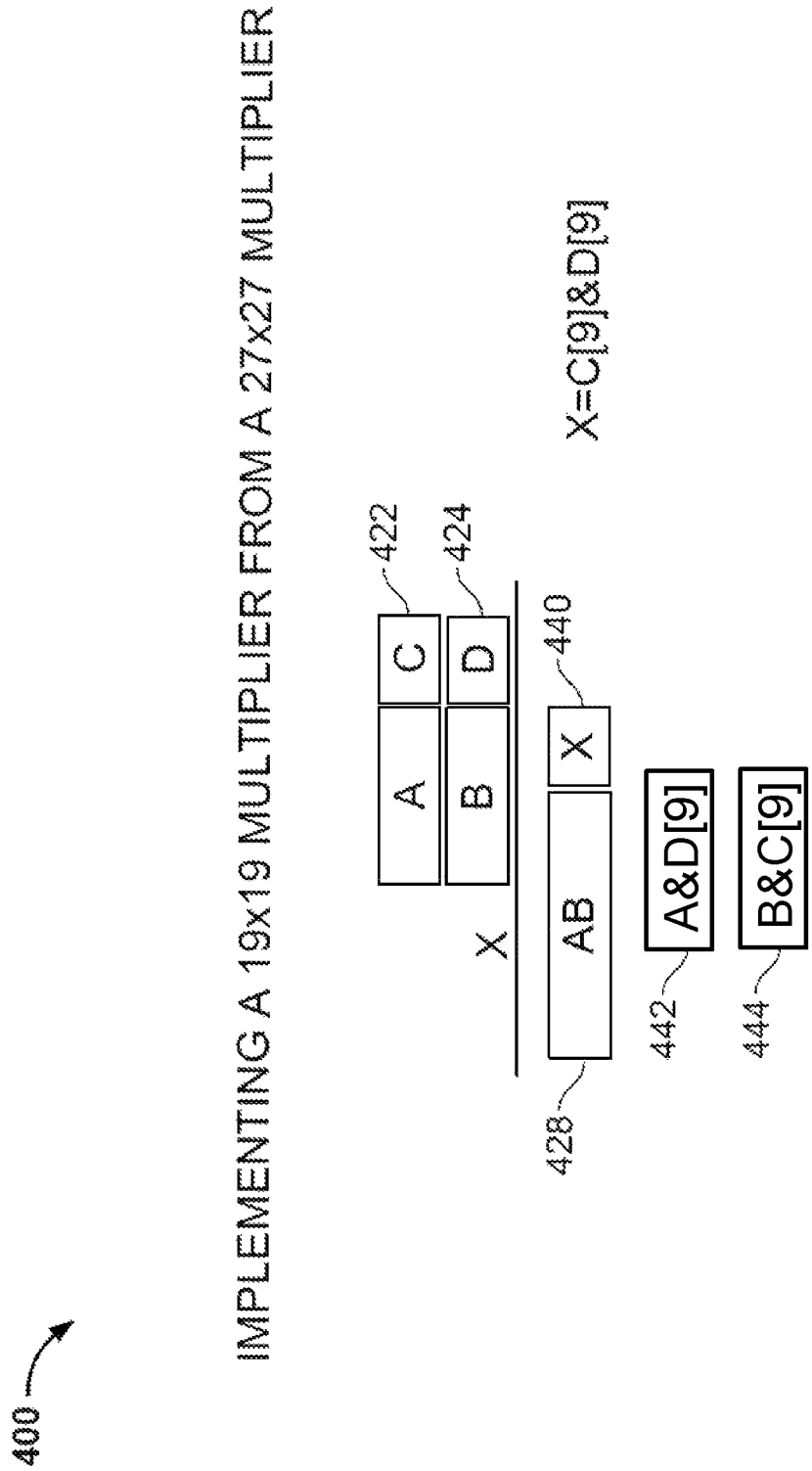
FIG. 4 shows an illustrative diagram of reduced precision number multiplication, in accordance with some embodiments of the present disclosure.

FIG. 4 shows an illustrative diagram of reduced power number multiplication, in accordance with some embodiments of the present disclosure. As described in relation to FIGS. 2 and 3, the one or more processing blocks that perform the smaller multiplications may be similar in form and/or function to processing block 100 of FIG. 1. Diagram 400 shows an implementation of a 19×19 multiplier from a 27×27 multiplier, though in general, one of ordinary skill in the art will understand that the implementation described in relation to FIG. 4 may be used to implement any smaller multiplier from a larger multiplier.

As in diagrams 200 and 300, diagram 400 shows the multiplication of a 27 bit number P by a 27 bit number Q. The multiplication may be performed by one or more processing blocks, each of which may be processing block 100 of FIG. 1. As in diagrams 200 and 300, at 422, P may be represented as an 18 bit number A and a 9 bit number C, where P=A*(2^9)+C. A may represent the most significant 18 bits of P, and C may represent the least significant 9 bits of P. Similarly, at 424, Q may be represented as an 18 bit number B and a 9 bit number D, where Q=B*(2^9)+D. B may represent the most significant 18 bits of Q, and D may represent the least significant 9 bits of Q.

As shown in FIG. 4, four intermediate products (e.g., A*B, C[9]*D[9], A*D[9], and B*C[9]) may be computed and combined to obtain the final product P*Q. The notation C[9] denotes the 9th bit of the 9 bit long number C (i.e., the most significant bit of C). Similarly, D[9] refers to the most significant bit of D. At 428, a processing block may be used to obtain the intermediate product AB using one of the processing block's multipliers to perform a 18×18 number multiplication. Similarly, one or more processing blocks may be used to obtain the intermediate product C[9]*D[9] at 440, A*D[9] at 442, and B*C[9] at 444. Any of the multiplications performed at 428, 440, 442, or 444 may be performed by multipliers similar in form and function to processing block 100 shown in relation to FIG. 1. Moreover, because multiplication with one bit may be performed with an AND gate, the three intermediate products 440, 442, and 444 may be implemented by using an AND gate. Thus, the intermediate product C[9]*D[9] may be implemented by an AND gate with inputs C[9] and D[9], or C[9]&D[9]. Similarly, the intermediate product A*D[9] may be implemented by an AND gate with inputs A and D[9], or A&D[9], and the intermediate product B&C[9] may be implemented by an AND gate with inputs B and C[9], or B&C[9]. In general, any one-bit multiplication described herein may be implemented using an AND gate.

The one or more processing blocks used at 428, 440, 442, and 444 may further include bit-shifters to shift the intermediate products by a number of bits to the left. As described in relation to FIG. 2, the bit-shifter used at 428 may shift the intermediate product AB to the left by 18 bits. Moreover, the bit-shifter used at 440 may shift the intermediate product C[9]*D[9] to the left by 8 bits), and the operation performed at 440 may be denoted (1×1)<<8. The intermediate product A*D[9] computed at 442 may be bit-shifted by 8 bits, and the intermediate product B*C[9] computed at 444 may be bit-shifted by 8 bits. The resulting shifted intermediate products may be added together to compute the final product of the 19×19 bit multiplication.

Figure 5:
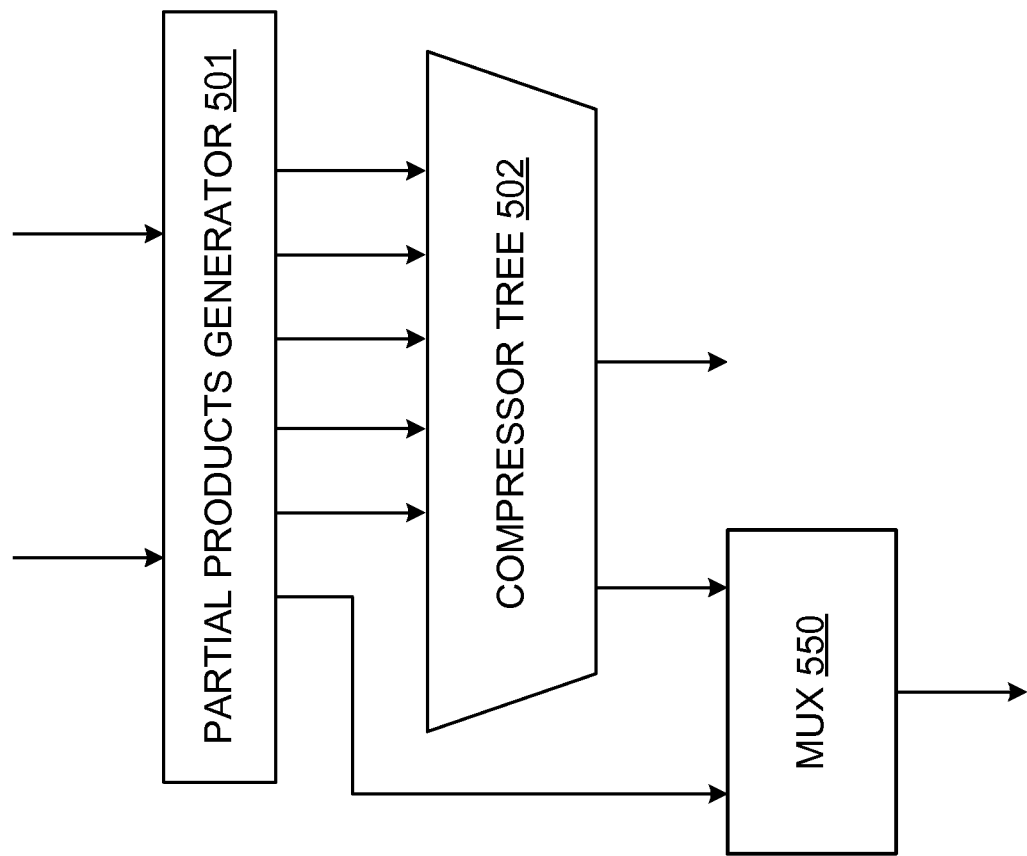
FIG. 5 shows an illustrative processing block in accordance with some embodiments of the present disclosure, in accordance with some embodiments of the present disclosure.

FIG. 5 shows an illustrative processing block 500 in accordance with some embodiments of the present disclosure. Processing block 500 may include a partial products generator 501, a compressor tree 502, and a multiplexer 550. Processing block 500 provides the ability to perform floating point multiplication at reduced power. In particular, as shown in FIG. 5, the most significant partial product that is provided by partial products generator 501 may be routed around compressor tree 502 to avoid having to do unnecessary computations and switching in compressor tree 502.

Advantageously, since the most significant partial product may be either a 0 (meaning that no action is required) or a 1× version of the multiplicand, no compression may be needed. Thus, the partial product bypasses compressor tree 502 and may be multiplexed directly onto the sum vector output of the multiplier, for example. By multiplexing the most significant partial product around the compressor tree, power consumption by the compressor tree may be reduced. In some embodiments, the booths coding for the most significant partial product may be adjusted so that only a 0 or a 1× multiplicand may be generated in this mode. Alternatively, a partial product for this mode may be generated directly in multiplexer 550.

Figure 6:
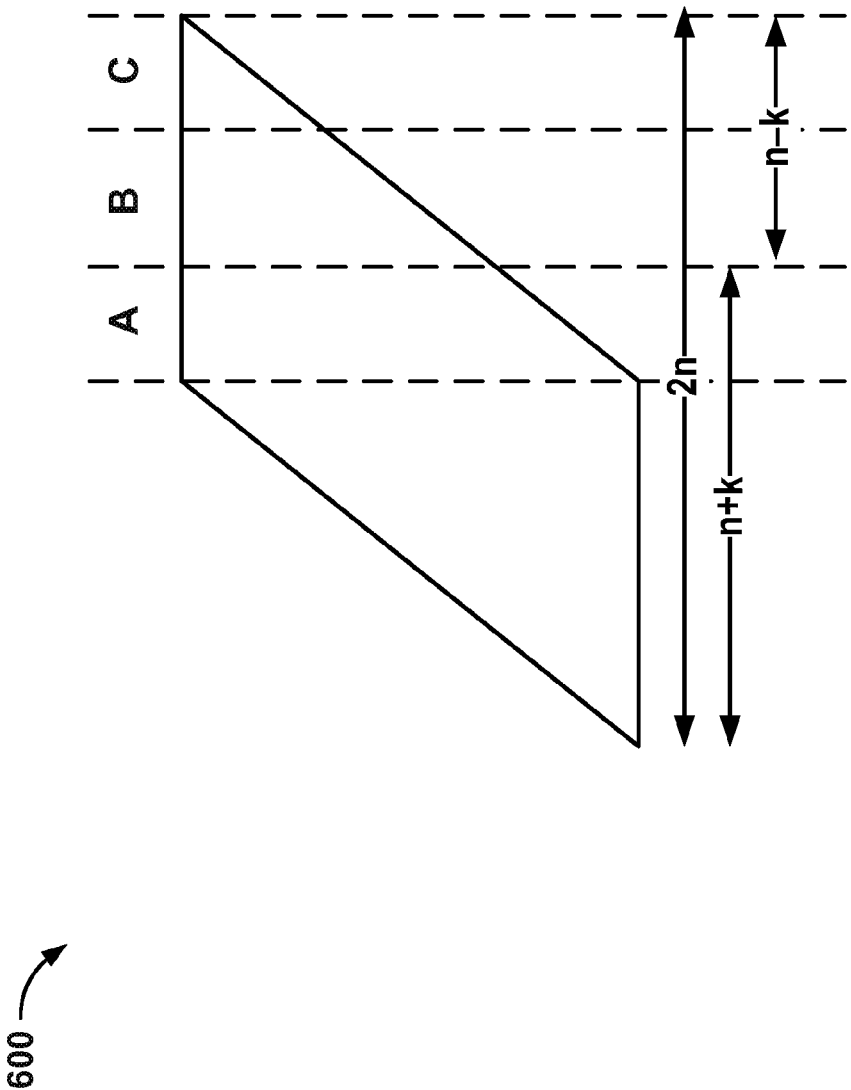
FIG. 6 shows an illustrative partial products diagram in accordance with some embodiments of the present disclosure.

FIG. 6 shows an illustrative partial products diagram 600 in accordance with some embodiments of the present disclosure. Diagram 600 shows different levels of truncation for the set of partial products resulting from an n×n multiplication operation. As shown in diagram 600, an n×n multiplier may be truncated to save power. To perform truncation of the n×n multiplier, varying amounts of the least significant bits of some of the partial products are zeroed. In particular, the less significant partial products (top of diagram 600) have a larger number of their least significant bits zeroed, compared to the more significant partial products (bottom of diagram 600), as shown by the straight vertical lines defining the regions A, B, and C.

In an example, for a radix 4 partial product, if the input and output precisions are n (full product is 2n in width), the number of bits that are kept to the right of the decimal point is k. In this case, the n-k least significant bits of the first partial product may be zeroed. Furthermore, the second partial product may have n-k-2 least significant bits zeroed. In general, the m-th partial product may have the n-k-2 (m-1) least significant bits zeroed, where m varies from 1 to n.

In some embodiments, region A is active and may not be subject to truncation. A contributes to the n bits output form the multiplier (along the bottom edge of diagram 600. Regions B and C may or may not be truncated to save power. In an example, region B may be used, but region C may be truncated. In this case, it may be desirable to perform a small amount of truncation, such that only region C is truncated. In another example, both regions B and C may be truncated. In this case, it may be desirable to perform a larger amount of truncation, such that both regions B and C are truncated, resulting in additional power savings than if only region C was truncated. While three regions are shown in FIG. 6, one of ordinary skill in the art will understand that any number of selectable truncation levels may be used without departing from the scope of the present disclosure. For each additional level of truncation, one additional configuration RAM (CRAM) bit may be required.

Figure 7:
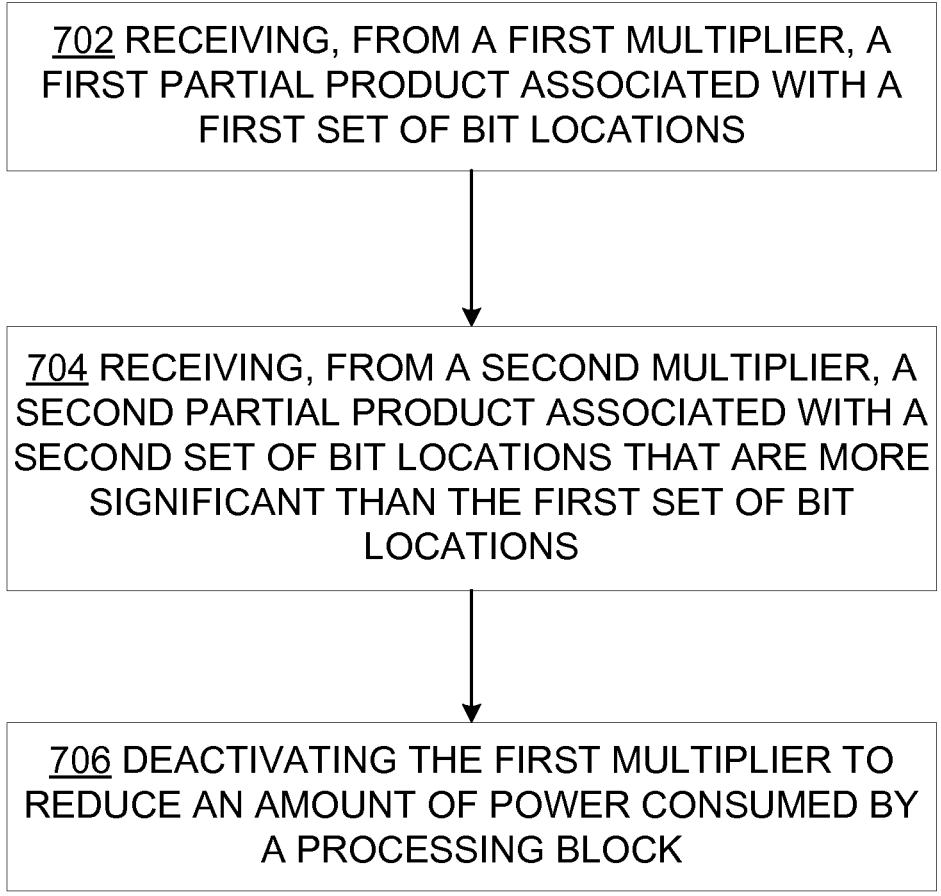
FIG. 7 shows an illustrative flow diagram of a process for performing reduced precision number multiplication, in accordance with some embodiments of the present disclosure.

FIG. 7 shows an illustrative flow diagram of a process 700 for performing reduced precision number multiplication, in accordance with some embodiments of the present disclosure. In particular, FIG. 7 illustrates the operation of a processing block for performing a reduced precision multiplication by deactivating one or more of the smaller multipliers in a larger multiplier as described above.

At 702, a first partial product is received from a first multiplier. The first partial product is associated with a first set of bit locations. As an example, the first partial product may be any of the partial products at 226, 230, or 232 shown in FIG. 2 or any of the partial products at 334 or 336 shown in FIG. 3.

At 704, a second partial product is received from a second multiplier. The second partial product is associated with a second set of bit locations that are more significant than the first set of bit locations identified at 702. As an example, the second partial product may be the partial product at 228 shown in FIG. 2 or the partial product at 328 shown in FIG. 3.

At 706, the first multiplier is deactivated to reduce an amount of power consumed by the processing block. In particular, the processing block may include a compressor tree, such as compressor tree 102 shown in FIG. 1 or compressor tree 502 shown in FIG. 5, which combines the first partial product and the second partial product to generate a multiplication result. When the first multiplier is deactivated, the multiplication result may be less precise than the result when the first multiplier is not deactivated. In some embodiments, at least one output of the compressor tree may be provided to a logic gate that is configured to selectively zero the at least one output. As shown in FIG. 1, the logic gate may be an AND gate, and the inputs to the AND gate may be a vector output from the compressor tree 102 and a control signal 112. As described in relation to FIG. 1, control signal 112 may be set to zero when it is desirable to save on power consumption by a carry propagation adder.

It should be understood that one or more elements (such as elements 702, 704, and 706) shown in flow diagram 700 may be combined with other elements, performed in any suitable order, performed in parallel (e.g., simultaneously or substantially simultaneously), or removed. For example, elements 702 and 704 may be performed simultaneously, or in a different order than shown in FIG. 7. In another example, element 706 may be performed in isolation, such that the first multiplier is deactivated without receiving partial products from either of the first or second multipliers. In yet another example, element 704 may be performed in isolation, such that the second multiplier provides the second partial product, but the first multiplier does not provide the first partial product, and the first multiplier is not deactivated. In this case, the first multiplier may have already been deactivated. In yet another example, elements 704 and 706 may be performed without element 702, such that the first multiplier is deactivated and does not provide a partial product. It is to be understood that the first and second multipliers as described in relation to FIG. 7 may each be a portion of a larger multiplier. Process 700 may be implemented using any suitable combination of hardware and/or software in any suitable fashion.

In some embodiments, the compressor tree 102 combines the first partial product and the second partial product to generate at least one output that is provided to a carry propagation adder such as carry propagation adder 109. The at least one output is zeroed before being provided to the carry propagation adder. The at least one output corresponds to a set of least significant bits of the first partial product.

Figure 8:
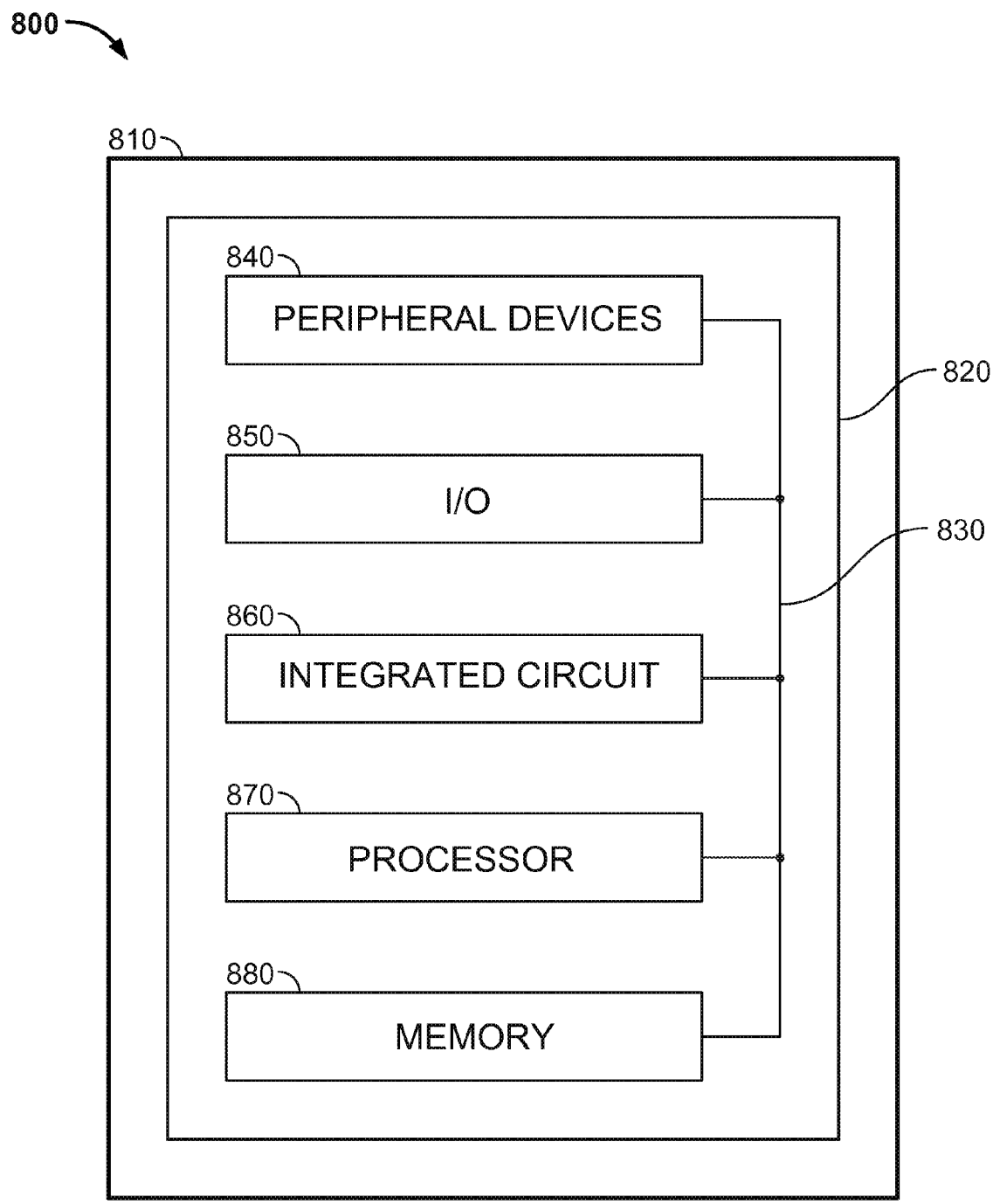
FIG. 8 shows an illustrative system that may be used to implement some embodiments of the present disclosure.

FIG. 8 shows an illustrative system that may be used to implement some embodiments of the present disclosure. System 800 may be or may include a circuit or other device (e.g., processing block, programmable integrated circuit, ASSP, ASIC, PLD, full-custom chip, dedicated chip). System 800 can include one or more of the following components: a processor 870, memory 880, I/O circuitry 850, a circuit 860, and peripheral devices 840. Circuit 860 may be a programmable integrated circuit device, such as an ASSP, an ASIC, a PLD, or any other suitable programmable integrated circuit device. In particular, circuit 860 may contain one or more processing blocks similar in form and function to processing block 100 and/or processing block 400, each of which may contain one or more of the multipliers described herein. These components are connected together by a system bus or other interconnections 830 and are populated on a circuit board 820 which is contained in an end-user system 810.

System 800 may be used in a wide variety of applications, such as computer networking, data networking, instrumentation, video processing, digital signal processing, or any other application where the advantage of using programmable or reprogrammable logic is desirable. Circuit 860 may be used to perform a variety of different logic functions and/or calculate a variety of different mathematical functions. For example, circuit 860 may be configured as a controller or group of processing blocks that work in cooperation with processor 870. Circuit 860 may also be used to perform signal processing. In yet another example, circuit 860 may be configured as an interface between processor 870 and one of the other components in system 800. It should be noted that system 800 is only exemplary, and that the true scope and spirit of the embodiments should be indicated by the following claims.

The foregoing is merely illustrative of the principles of the embodiments and various modifications can be made by those skilled in the art without departing from the scope and spirit of the embodiments disclosed herein. The above described embodiments of the present disclosure are presented for purposes of illustration and not of limitation, and the present invention is limited only by the claims which follow.

What is claimed is:

1. A configurable specialized processing block on an integrated circuit device, the configurable specialized processing block comprising:
   a first multiplier that generates a first partial product associated with a first set of bit locations;
   a second multiplier that generates a second partial product associated with a second set of bit locations that are more significant than the first set of bit locations;
   a switching circuitry to deactivate the first multiplier to reduce an amount of power consumed by the configurable specialized processing block;
   a compressor tree that combines the first partial product and the second partial product to generate a multiplication result that is less precise when the first multiplier is deactivated compared to when the first multiplier is not deactivated; and
   a multiplexer that directly receives a portion of the second partial product, including the most significant bit of the second partial product, via a route that bypasses the compressor tree.

2. The configurable specialized processing block of claim 1, wherein at least one output of the compressor tree is provided to an AND gate that selectively zeros the at least one output by receiving a control signal that is selectively set to zero.

3. The configurable specialized processing block of claim 1, further comprising a compressor tree that combines the first partial product and the second partial product to generate at least one output that is provided to a carry propagation adder, wherein the at least one output is zeroed before being provided to the carry propagation adder, and the at least one output corresponds to a set of least significant bits of the first partial product.

4. The configurable specialized processing block of claim 1, further comprising truncating circuitry to set a first number of the least significant bits of the first partial product to zero and to set a second number of the least significant bits of the second partial product to zero, wherein the first number is greater than the second number.

5. The configurable specialized processing block of claim 4, wherein the truncating circuitry further selects from at least two truncation levels, each truncation level associated with a different precision of a multiplication operation.

6. The configurable specialized processing block of claim 1, wherein the integrated circuit device is a programmable logic device.

7. A method of configuring an integrated circuit device comprising a multiplier comprising a first portion and a second portion, said method comprising:
   selectively deactivating the first portion of the multiplier to reduce an amount of power consumed by the integrated circuit device, wherein the first portion of the multiplier and the second portion of the multiplier generate partial products associated with different sets of bit locations;
   configuring a compressor tree to combine the partial products in order to generate a multiplication result that is less precise when the first portion of the multiplier is deactivated compared to when the first portion of the multiplier is not deactivated; and
   configuring a multiplexer to directly receive a portion of the partial products, including the most significant bit of the partial products, via a route that bypasses the compressor tree.

8. The method of claim 7, further comprising providing the at least one output of the compressor tree to an AND gate and with the AND gate selectively zeroing the at least one output by receiving a control signal that is selectively set to zero.

9. The method of claim 7, further comprising configuring a compressor tree to combine the partial products in order to generate at least one output that is provided to a carry propagation adder, wherein the at least one output is zeroed before being provided to the carry propagation adder, and the at least one output corresponds to a set of least significant bits of at least one of the partial products.

10. The method of claim 7, wherein the first portion of the multiplier generates a first partial product associated with a first set of bit locations, and the second portion of the multiplier generates a second partial product associated with a second set of bit locations more significant than the first set of bit locations.

11. The method of claim 7, further comprising configuring truncating circuitry to set a first number of the least significant bits of one of the partial products to zero and to set a second number of the least significant bits of another of the partial products to zero, wherein the first number is greater than the second number.

12. The method of claim 11, further comprising configuring the truncating circuitry to select from at least two truncation levels, each truncation level associated with a different precision of a multiplication operation.

13. The method of claim 7, wherein the integrated circuit device is a programmable logic device.

14. The method of claim 7, wherein the integrated circuit device includes a plurality of configurable specialized processing blocks, said configurable specialized processing blocks comprising said portions of the multiplier.

15. A method of performing reduced precision number multiplication in a programmable integrated circuit device comprising a first multiplier associated with a first partial product at a first set of bit locations and a second multiplier associated with a second partial product at a second set of bit locations, the method comprising:
   receiving, from the second multiplier, the second partial product, wherein the second set of bit locations is more significant than the first set of bit locations, and the first multiplier is deactivated for at least some of the time that the integrated circuit device is in operation, to reduce an amount of power consumed by the integrated circuit device
   combining, at a compressor tree, the first partial product and the second partial product in order to generate a multiplication result that is less precise when the first multiplier is deactivated compared to when the first multiplier is not deactivated; and
   receiving, at a multiplexer, a portion of the second partial product, including the most significant bit of the second partial product, via a route that bypasses the compressor tree.

16. The method of claim 15, wherein at least one output of the compressor tree is provided to an AND gate that selectively zeros the at least one output by receiving a control signal that is selectively set to zero.

* * * * *